United States Patent
Ulrey et al.

(10) Patent No.: US 9,261,051 B2
(45) Date of Patent: Feb. 16, 2016

(54) METHODS AND SYSTEMS FOR BOOST CONTROL

(71) Applicant: Ford Global Technologies, LLC, Dearborn, MI (US)

(72) Inventors: Joseph Norman Ulrey, Dearborn, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 13/965,952

(22) Filed: Aug. 13, 2013

(65) Prior Publication Data
US 2015/0047347 A1 Feb. 19, 2015

(51) Int. Cl.
*F02B 33/44* (2006.01)
*F02M 25/07* (2006.01)
*F02D 23/00* (2006.01)
*F02D 41/00* (2006.01)
*F02B 29/04* (2006.01)

(52) U.S. Cl.
CPC .......... *F02M 25/07* (2013.01); *F02D 41/0007* (2013.01); *F02D 41/0065* (2013.01); *F02M 25/071* (2013.01); *F02M 25/0709* (2013.01); *F02M 25/0751* (2013.01); *F02M 25/0754* (2013.01); *F02B 29/0437* (2013.01); *F02D 2041/0067* (2013.01); *F02D 2200/0418* (2013.01); *F02M 25/0728* (2013.01)

(58) Field of Classification Search
CPC .......... F02M 25/0709; F02M 25/072; F02M 25/0702; F02M 2025/0763; F02M 2025/0765; F02B 37/18; F02B 37/183; F02B 37/127; F02B 37/16; F02D 41/0007; F01N 3/00

USPC ............... 60/605.2, 611, 605.1, 602; 123/561
See application file for complete search history.

(56) References Cited

U.S. PATENT DOCUMENTS 3,614,259 A 10/1971 Neff
4,351,154 A 9/1982 Richter
(Continued)

FOREIGN PATENT DOCUMENTS

| DE | 10 2010 048 465 | * 10/2011 | ............. F02B 29/04 |
|----|-----------------|-----------|---------|
| EP | 0435357 A1 | 7/1991 | |
| EP | 2317111 A1 | 5/2001 | |
| EP | 1124047 A1 | 8/2001 | |
| EP | 2426340 A1 | 3/2012 | |
| EP | 2562397 A1 | 8/2012 | |

(Continued)

OTHER PUBLICATIONS

Ulrey, Joseph Norman et al., "Methods and Systems for Boost Control," U.S. Appl. No. 13/965,901, filed Aug. 13, 2013, 54 pages.
(Continued)

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP (57) ABSTRACT

Methods and systems are provided for managing a compressor temperature using EGR to address surge and condensation. A variable mixture of cooled compressor recirculation flow and hot EGR is provided to a compressor inlet. A composition of the mixture is adjusted to maintain a compressor inlet temperature sufficiently warm so as to reduce ingestion of condensation, and a compressor outlet temperature sufficiently cold to be within component temperature limits with flow above the surge limit.

20 Claims, 4 Drawing Sheets

(56) References Cited

U.S. PATENT DOCUMENTS

| | | | |
|---|---|---|---|
| 4,389,845 | A | 6/1983 | Koike |
| 4,443,153 | A | 4/1984 | Dibelius |
| 4,544,326 | A | 10/1985 | Nishiguchi et al. |
| 4,949,276 | A | 8/1990 | Staroselsky et al. |
| 6,079,210 | A | 6/2000 | Pintauro et al. |
| 6,408,833 | B1 | 6/2002 | Faletti |
| 6,565,479 | B2 | 5/2003 | Fattic et al. |
| 6,681,171 | B2 | 1/2004 | Rimnac et al. |
| 6,725,847 | B2 | 4/2004 | Brunemann et al. |
| 6,983,596 | B2 | 1/2006 | Frankenstein et al. |
| 7,137,253 | B2 | 11/2006 | Furman et al. |
| 7,163,005 | B2 | 1/2007 | Tussing et al. |
| 7,614,232 | B2 * | 11/2009 | Swenson et al. ............... 60/611 |
| 7,640,744 | B2 | 1/2010 | Rollinger et al. |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,333,071 | B2 | 12/2012 | Oakley et al. |
| 2006/0196182 | A1 | 9/2006 | Kimoto et al. |
| 2008/0163855 | A1 | 7/2008 | Matthews et al. |
| 2009/0071150 | A1 | 3/2009 | Joergl et al. |
| 2009/0271094 | A1 * | 10/2009 | Stablein et al. ............... 701/108 |
| 2011/0023842 | A1 | 2/2011 | Kurtz |
| 2011/0094480 | A1 | 4/2011 | Suhocki et al. |
| 2012/0014812 | A1 | 1/2012 | Blaiklock et al. |
| 2012/0297765 | A1 | 11/2012 | Vigild et al. |
| 2013/0219886 | A1 * | 8/2013 | Koch et al. ................... 60/605.2 |
| 2013/0340428 | A1 * | 12/2013 | Graichen et al. ............. 60/605.2 |

OTHER PUBLICATIONS

Banker, Adam Nathan et al., "Methods and Systems for Torque Control," U.S. Appl. No. 13/965,917, filed Aug. 13, 2013, 46 pages.
McConville, Gregory Patrick et al., "Methods and Systems for Boost Control," U.S. Appl. No. 13/965,938, filed Aug. 13, 2013, 40 pages.
Jankovic, Mrdjan J. et al., "Methods and Systems for Boost Control," U.S. Appl. No. 13/829,648, filed Mar. 14, 2013, 39 pages.
McConville, Gregory Patrick et al., "Methods and Systems for Boost Control," U.S. Appl. No. 13/965,963, filed Aug. 13, 2013, 45 pages.
Styles, Daniel Joseph et al., "Methods and Systems for Boost Control," U.S. Appl. No. 13/965,698, filed Aug. 13, 2013, 43 pages.
Buckland Julia Helen et al., "Methods and Systems for Surge Control," U.S. Appl. No. 113/965,725, filed Aug. 13, 2013, 38 pages.
Ulrey, Joseph Norman et al., "Methods and Systems for Condensation Control," U.S. Appl. No. 13/965,751, filed Aug. 13, 2013, 36 pages.
Ulrey, Joseph Norman et al., "Methods and Systems for Condensation Control," U.S. Appl. No. 13/965,763, filed Aug. 13, 2013, 37 pages.
Ulrey, Joseph Norman et al., "Methods and Systems for EGR Control," U.S. Appl. No. 13/966,006, filed Aug. 13, 2013, 56 pages.
Ulrey, Joseph Norman et al., "Methods and Systems for EGR Control," U.S. Appl. No. 13/965,794, filed Aug. 13, 2013, 56 pages.
Byrd, Kevin Durand et al., "Multi-Staged Wastegate," U.S. Appl. No. 13/570,025, filed Aug. 8, 2012, 26 pages.
Ulrey, Joseph Norman et al., "Method and System for Fuel Vapor Management," U.S. Appl. No. 13/660,884, filed Oct. 25, 2012, 38 pages.

* cited by examiner

METHODS AND SYSTEMS FOR BOOST CONTROL

FIELD

The present application relates to methods and systems for coordinating compressor recirculation flow and EGR to improve boost control.

BACKGROUND AND SUMMARY

Engine systems may be configured with a boosting device, such as a turbocharger, for providing a boosted aircharge and improving peak power outputs. Therein a turbine is rotated using energy from an exhaust flow, the turbine then driving a compressor which delivers a boosted aircharge to the engine intake. In an effort to meet stringent federal government fuel economy standards, engine systems may also be configured with exhaust gas recirculation (EGR) systems wherein at least a portion of the exhaust gas is recirculated to the engine intake. For example, the EGR system may be a low-pressure EGR system (LP-EGR) that recirculates exhaust gas from downstream of an exhaust turbine to upstream of an exhaust compressor. EGR benefits include an increase in engine dilution, decrease in exhaust emissions, and improvements in fuel economy.

The compressor and other intake system components have temperature limitations, to avoid coking and/or thermal stress or damage. Therefore, the EGR is cooled substantially before introduction into the air induction system by a costly EGR cooler (different from the charge air cooler located downstream of the compressor). However, since EGR has relatively large water content (e.g., 8% water by mass for gasoline), the addition of LP-EGR at this substantially lower temperature to the intake at a pre-compressor location increases the risk of condensation at both a compressor inlet as well as a charge air cooler outlet. Specifically, under cold ambient conditions, when the humid EGR is mixed with cold ambient air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events.

To address these issues, engine control systems may employ various approaches to limit the condensation. One example approach is shown by Rimnac et al. in U.S. Pat. No. 6,681,171. Therein, if conditions favoring EGR condensation are determined, intake manifold temperatures are increased by redirecting some or all of the EGR flow to avoid the EGR cooler. Additionally, some or all of the charge air is redirected from an outlet of the compressor to the engine intake, while bypassing the charge air cooler. As a result, a higher effective intake air temperature is provided which reduces the likelihood of condensation.

However, the inventors herein have identified potential issues with such an approach. Since the approach of '171 does not actively estimate humidity at the engine intake, there may be ambient temperature and humidity conditions where even with the redirection of the charge air, condensation occurs at the engine intake, degrading, boosted engine performance. It also does not address the compressor temperature limitations.

In one example, some of the above issues may be addressed by a method for an engine comprising: mixing compressor recirculation flow from downstream of a charge air cooler with exhaust gas, and delivering the mixture to a compressor inlet. In this way, hot EGR that has not been cooled by an EGR cooler can be mixed with cooled compressor recirculation flow to improve temperature and relative humidity management of the compressor inlet air.

As one example, a boosted engine system may include a first passage for recirculating compressed air from downstream of a charge air cooler (and upstream of an intake throttle) to a compressor inlet via a compressor recirculation valve. In this way, compressor recirculation flow that has been cooled upon passage through the charge air cooler can be delivered to the compressor inlet. The engine may further include a second passage for recirculating exhaust gas from downstream of an exhaust turbine to the compressor inlet, unobstructed, via an EGR valve. In this way, hot EGR that has not passed through an intercooler or any other secondary cooling device can be delivered to the compressor inlet. The first and second passages may join at a location upstream of the compressor and downstream of both the valves. By adjusting a position of the first and second valves, cooled compressor recirculation flow may be mixed with the hot EGR to provide a temperature-controlled mixture to the compressor inlet. For example, the composition of the mixture may be adjusted to increase the amount of hot EGR and decrease the amount of compressor recirculation flow when the compressor inlet temperature is low. As another example, the composition of the mixture may be adjusted to decrease the amount of hot EGR and increase the amount of compressor recirculation flow when the compressor outlet temperature is high, or when there is a possibility of compressor surge.

In this way, compressor temperature management is improved. By not requiring cooled EGR, the need for a dedicated EGR cooler is reduced. For example, the cooler may be dramatically downsized or removed from the design, providing component reduction benefits. By using cooled compressor recirculation flow to cool the EGR, a relative humidity and temperature at the compressor inlet, as well at a compressor outlet, can be tuned more precisely. In particular, the compressor inlet and outlet temperatures can be maintained within a range that improves turbocharger performance. By reducing the formation of condensation at the compressor inlet, issues related to the ingestion of condensate (such as misfire, degradation of compressor blades, and engine stall) can be better addressed. Further, use of cooled compressor recirculation flow can concurrently improve the compressor's margin to surge, while also reducing thermal amplification effects that can occur with the use of warm compressor recirculation flow. Overall, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
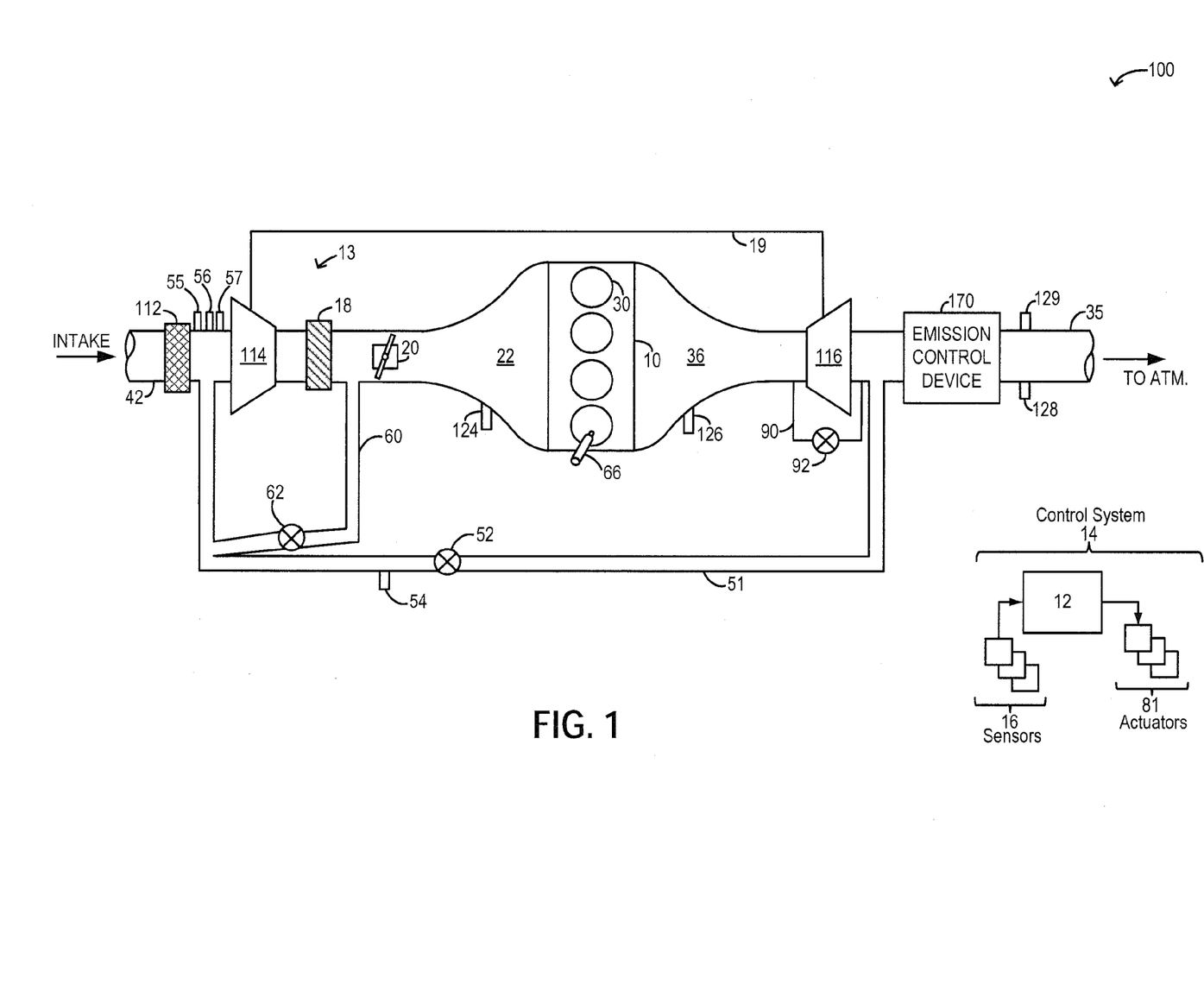
FIG. 1 shows an example embodiment of a boosted engine system.

The following description relates to systems and methods for adjusting a proportion of compressed aircharge recirculated to a compressor inlet in a boosted engine system, such as the system of FIG. 1, from downstream of a charge air cooler. A controller may be configured to perform a control routine, such as the routine of FIG. 5, to adjust the amount of cooled compressed aircharge recirculated from downstream of the charge air cooler relative to the amount of EGR based on surge and condensation considerations. Therein, the controller may adjust the amounts based on a compressor inlet temperature and further based on EGR so that a temperature and humidity of an aircharge entering the compressor is maintained above a threshold where condensation can occur. The controller may also adjust the amounts based on an indication of compressor surge to improve a margin to the surge limit. As elaborated at FIG. 5, the controller may select between using increased hot EGR or increased recirculation of cool compressed aircharge to reduce surge based on condensation considerations. Example adjustments are described with reference to FIG. 6. By reducing condensation, misfires and compressor degradation associated with the condensation can be reduced. By addressing surge using increased recirculation of cooled compressor aircharge, mass flow through the compressor is increased and a margin to surge can be improved. Overall, boosted engine performance is improved.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-water heat exchanger, for example. In the embodiment shown in FIG. 1, the pressure of the air charge within the intake manifold is sensed by manifold air pressure (MAP) sensor 124.

During selected conditions, such as during a tip-out, when going from engine operation with boost to engine operation without boost, compressor surge can occur. This is due to reduced forward flow through the compressor, causing surge and degraded turbocharger performance. In addition, surge can lead to NVH issues such as undesirable noise from the engine intake system. To reduce compressor surge, at least a portion of the aircharge compressed by compressor 114 may be recirculated to the compressor inlet. This allows compressor flow to be substantially maintained. A compressor recirculation passage 60 may be provided for recirculating cooled compressed air from the compressor outlet, downstream of charge-air cooler 18 to the compressor inlet. Compressor recirculation valve 62 may be provided for adjusting an amount of cooled recirculation flow recirculated to the compressor inlet. In the depicted example, valve 62 is a continuously variable valve whose position can be adjusted to a fully open position, a fully closed position, or any position therebetween. Thus recirculation valve 62 may also be referred to herein as a continuously variable compressor recirculation valve, or CRV. In the depicted example, CRV 62 is configured as a throttle valve, although in other embodiments, the CRV may be configured differently (e.g., as a poppet valve).

In alternate embodiments, compressor recirculation valve 62 may be configured as a two-position valve adjustable to one of a fully closed and a fully open position. However, the inventors have recognized that by using a CRV, boost response and surge margins can be improved.

During nominal engine operating conditions, the CRV 62 may be kept nominally closed, or nearly closed. In such a position, the valve may be operating with known or negligible leakage. As elaborated herein, in response to an indication of surge, an opening of CRV 62 may be increased to reduce a boost pressure downstream of the compressor, thereby maintaining or increasing flow through the compressor. The opening of CRV 62 may also be increased during conditions where the compressor outlet temperature is above a threshold to enable cooling of the flow being compressed by the compressor. In some embodiments, one or more sensors may be coupled in compressor recirculation passage 60 to determine the mass of recirculated flow delivered from the throttle inlet to the intake passage. The various sensors may include, for example, pressure, temperature, and/or flow sensors. During other conditions, such as in response to an indication of condensation at the compressor inlet, an opening of CRV 62 may be decreased to reduce cooling of a compressor inlet temperature. In this way, CRV 62 may used for surge management as well as compressor temperature management.

In some embodiments, during nominal operating conditions, such as steady-state boosted engine operation, CRV 62 may be kept partially open to increase compressor flow and provide some surge margin. Herein, the partially open (e.g., semi-open) position may be a default position of the valve, the valve opening increased from the partially-open position to or towards a fully-open position in response to the indication of surge to reduce boost pressure downstream of the compressor. Likewise, the valve opening may be decreased from the partially-open position towards or to a fully-closed position in response to a transient increase in torque demand (e.g., during an operator pedal tip-in) to rapidly increase boost pressure downstream of the compressor. For example, the valve may be shifted from the default, partially open position to or towards a fully-closed position to reduce torque transients and improve torque responsiveness.

One or more sensors may be coupled to intake passage 42, upstream of compressor 114, for determining a composition and condition of aircharge entering the compressor. These sensors may include, for example, a compressor inlet temperature sensor 55, a compressor inlet pressure (CIP) sensor 56, as well as a compressor inlet humidity sensor 57. Still other sensors may include, for example, air-fuel ratio sensors, etc. The sensors may estimate a condition of the intake air received at the compressor inlet from the intake passage as well as the aircharge recirculated from upstream or downstream of the CAC. In addition, when EGR is enabled, the sensors may estimate a temperature, pressure, humidity, and air-fuel ratio of the aircharge mixture including fresh air, recirculated compressed air, and exhaust residuals received at the compressor inlet. In other examples, one or more of the compressor inlet conditions (such as humidity, temperature, etc.) may be inferred based on engine operating conditions.

A wastegate 92 may be actuated open to dump at least some exhaust pressure from upstream of the turbine to a location downstream of the turbine via exhaust bypass 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments. In response to a transient increase in torque demand, such as during an operator pedal tip-in, the wastegate may be actuated closed to increase a turbine inlet pressure, thereby increasing turbine peak power output. This helps to reduce turbo lag and torque transients and improves torque response.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust gas from the one or more exhaust manifold sections is directed to turbine 116 to drive the turbine. When reduced turbine torque is desired, some exhaust gas may be directed instead through wastegate 90, by-passing the turbine. The combined flow from turbine 116 and wastegate 90 then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust gas from emission control 170 may be released into the atmosphere via exhaust conduit 35. Depending on operating conditions, however, some exhaust gas may be diverted instead to EGR passage 51, and EGR valve 52, to the inlet of compressor 114. In the depicted embodiment, EGR passage 51 does not include an EGR cooler (e.g., an intercooler or alternate secondary fluid cooling device). In this way, exhaust gas expelled out of engine cylinders 30 through their respective exhaust valves can flow unobstructed from the exhaust manifold to the EGR valve, and from there on to the compressor inlet. In alternate embodiments, EGR passage 51 may include a substantially downsized EGR cooler. As elaborated below, by mixing hot EGR with cooled compressor recirculation flow before delivering the mixture to a compressor inlet, the need for a larger EGR cooler for controlling a temperature of the EGR is reduced, allowing for the EGR cooler to be dramatically downsized or removed.

EGR valve 52 may be opened to admit a controlled amount of exhaust gas to the compressor inlet for desirable combustion and emissions-control performance. In this way, engine system 10 is adapted to provide external, low-pressure (LP) EGR by tapping exhaust gas from downstream of turbine 116. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

One or more sensors may be coupled to EGR passage 51 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. An opening of the EGR valve may be adjusted based on the engine operating conditions and the EGR conditions to provide a desired amount of engine dilution.

In the depicted embodiment, EGR passage 51 merges with compressor recirculation passage 60 at a location upstream of the compressor inlet and downstream of EGR valve 52 and CRV 62. Since EGR has relatively large water content, the LP-EGR provided to the intake at this pre-compressor location may be prone to condensation. In particular, based on EGR conditions, engine operating conditions, and a compressor inlet temperature at a time when the EGR is received, condensation can occur at both the compressor inlet as well as the charge air cooler outlet. For example, under cold ambient conditions, when cooled humid EGR is mixed with cold ambient intake air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events. As elaborated herein, a controller may adjust a compressor inlet temperature to reduce the likelihood of condensation. For example, by using hot EGR, the compressor inlet temperature may be maintained above a threshold temperature that is based on EGR and condensation considerations.

Figure 5:
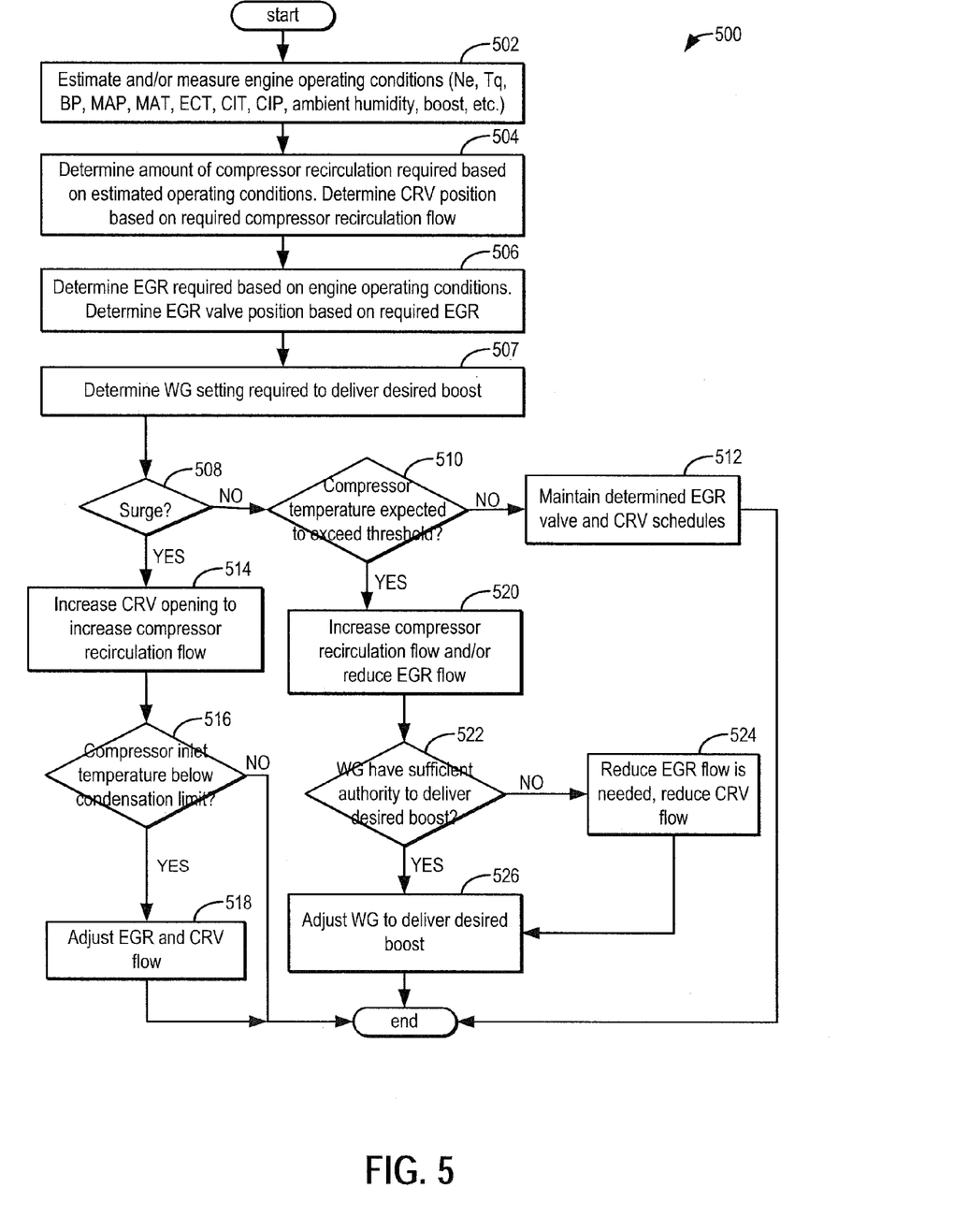
FIG. 5 shows a high level flow chart for adjusting compressor recirculation flow and EGR based on condensation considerations.

As elaborated herein with reference to FIG. 5, the EGR received from EGR passage 51 may be mixed with cooled compressor recirculation flow received from recirculation passage 60 at a location downstream of valves 52, 62 and upstream of the compressor inlet to provide a temperature-controlled mixture of exhaust residuals and compressor recirculation flow. The mixed is then delivered to the compressor inlet. This enables compressor temperature (e.g., compressor inlet temperature and/or compressor outlet temperature) to be better managed. In addition, a desired engine dilution can be achieved with reduced propensity for condensation, surge, and related issues. By reducing the likelihood of EGR condensation, issues associated with the ingestion of condensate at the compressor are reduced. For example, if the compressor inlet temperature is low, the ambient humidity is high, the controller may adjust valves 52 and 62 to increase EGR flow to the compressor inlet, and decrease compressor recirculation flow to raise the compressor inlet temperature above a threshold and reduce inlet condensation. In another example, when the compressor inlet temperature is high, the compressor outlet temperature is high, the controller may adjust valves 52 and 62 to decrease EGR flow to the compressor inlet, and increase compressor recirculation flow to lower the compressor inlet or outlet temperature below a threshold and reduce compressor thermal damage. Overall, compressor thermal management is improved.

While the depicted embodiment shows the engine system not including an EGR cooler in the EGR passage, it will be appreciated that in alternate embodiments, the engine system may include a bypass EGR passage with an EGR cooler coupled to EGR passage. When included, a portion of exhaust gas received in EGR passage 51 may be diverted through the bypass EGR passage and passed through the EGR cooler to provide an amount of EGR cooling. However, by using a configuration where the EGR cooler is not required and EGR cooling is achieved by mixing the EGR with compressor recirculation flow, energy losses associated with the usage of a heat exchanger are reduced.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and air-fuel ratio sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 62, wastegate actuator 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described herein with regard to FIG. 5.

Figure 2:
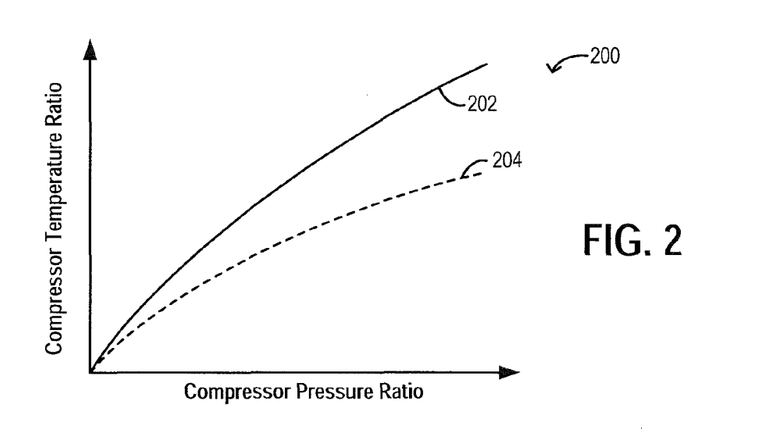
FIG. 2 shows a map depicting variation in a relationship between compressor inlet and outlet temperature with pressure ratio and compressor efficiency.

Map 200 of FIG. 2 shows a relationship between compressor temperature and pressure ratios at various compressor efficiencies. The compressor temperature ratio plotted along the y-axis is a ratio of the absolute compressor outlet temperature to the absolute compressor inlet temperature $$\left(\frac{T_c^{out}}{T_c^{in}}\right).$$

The compressor pressure ratio plotted along the x-axis is a ratio of the compressor outlet pressure to the compressor inlet pressure $$\left(\frac{P_c^{out}}{P_c^{in}}\right).$$

As such, the compressor temperature ratio is related to the compressor pressure ratio as per the equation:

$$\frac{T_c^{out}}{T_c^{in}} = 1 + \frac{1}{\eta_c}\left[\left(\frac{P_c^{out}}{P_c^{in}}\right)^{\frac{y}{y-1}} - 1\right]$$

where $\eta_c$ is the compressor efficiency. Map 200 depicts the relationship between compressor ratio and compressor temperature ratio at different compressor efficiencies with plot 202 depicting the relationship at a first, lower efficiency and plot 204 depicting the relationship at a second, higher efficiency.

Compressors are typically limited by a maximum outlet temperature which, as depicted by the trend of plots 202 and 204, is a function of the compressor inlet temperature, compressor pressure ratio and compressor efficiency. Thus, to maintain compressor operation at or around a target outlet pressure and temperature below a threshold, a controller may estimate a corresponding target (maximum) compressor inlet temperature for any set of engine operating conditions. The controller may then adjust the proportion of EGR flow and compressor recirculation flow received at the compressor inlet to limit the compressor inlet temperature at or below the target compressor inlet temperature.

Figure 3:
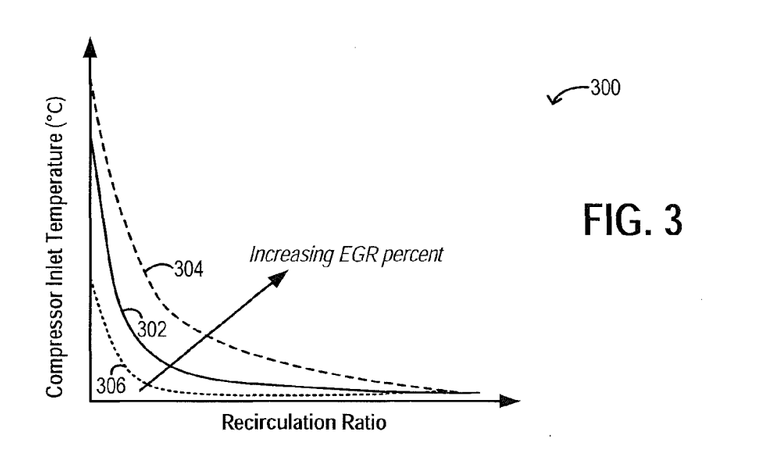
FIG. 3 shows a map depicting a relationship between compressor inlet temperature, recirculation ratio, and EGR percent.

Map 300 of FIG. 3 shows a relationship between the compressor inlet temperature and a recirculation ratio at a given EGR percent. The compressor inlet temperature is plotted along the y-axis and the recirculation ratio is plotted along the x-axis. The recirculation ratio corresponds to the percent of cooled compressed air recirculated to the compressor inlet from downstream of a charge air cooler. As shown by plots 302-306, for a given EGR percent, as the recirculation ratio increases, the compressor inlet temperature decreases. In the depicted example, at plot 302, the EGR percent is 15%, the EGR temperature is 600° C. and the compressor recirculation temperature is 38° C. (100° F.), and the compressor inlet temperature is 25° C.

The relationship shown at plot 302 can also be represented by the equation:

$$T_c^{in} = \frac{(1-x)T_a + xT_{egr} + \kappa T_r}{1+\kappa},$$

where $T_c^{in}$ is the compressor inlet temperature, and $T_{egr}$ is the EGR temperature.

Therein, x is the EGR percent calculated as $$x = \frac{\dot{m}_{egr}}{\dot{m}_{air} + \dot{m}_{egr}},$$

where $\dot{m}_{egr}$ is the mass flow of EGR and $\dot{m}_{air}$ is the mass flow of intake air received at the compressor inlet. Further still, κ is the recirculation ratio calculated as $$\kappa = \frac{\dot{m}_r}{\dot{m}_{air} + \dot{m}_{egr}},$$

where $\dot{m}_r$ is the recirculation flow. Plots 304 and 306 show the same relationship at different EGR percents with plot 304 showing the relationship at 20% EGR and plot 306 showing the relationship at 10% EGR.

Figure 4:
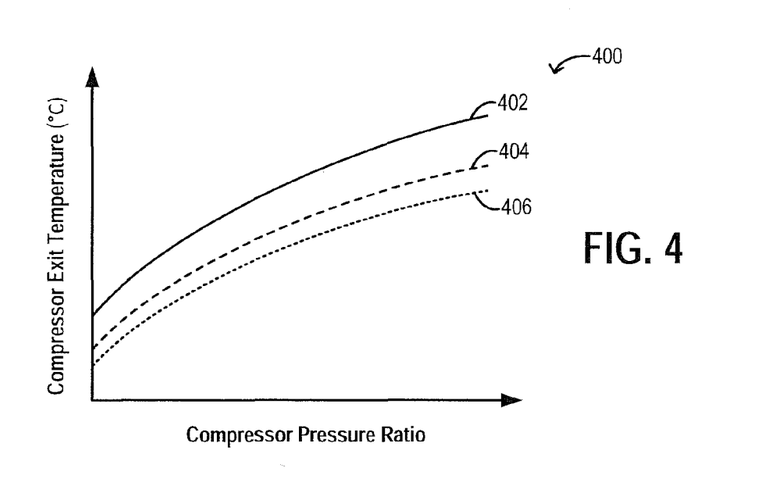
FIG. 4 shows a plot depicting changes in compressor outlet temperatures with EGR, in the presence or absence of compressor recirculation flow.

Now turning to FIG. 4, Map 400 shows a relationship between the compressor exit (or outlet) temperature and a compressor pressure ratio at a given EGR percent based on the percent of compressor recirculation flow received. The compressor exit temperature is plotted along the y-axis and the compressor pressure ratio is plotted along the x-axis. In the depicted example, the EGR percent (x) is 15%, and the compressor efficiency ($\eta_c$) is 75%. Plots 402-406 show the relationship at a compressor ratio of 0 (that is with no recirculation), 0.5, and 1.0 respectively. As shown by the trend of plots 402-406, as the recirculation ratio increases, for a given compressor pressure ratio (κ), a lower compressor outlet temperature is achieved. In other words, a lower compressor outlet temperature can be achieved for a given EGR percent by increasing the amount of compressor recirculation flow.

A controller may use the relationships illustrated in FIGS. 2-4 to adjust a proportion of EGR recirculation and compressor flow recirculation delivered to the compressor inlet to manage an inlet and/or outlet temperature of the compressor. For example, it may be assumed that conventionally 20% un-cooled EGR would cause the compressor inlet temp to rise proportionately. For example with 0° C. ambient temperature and 600° C. EGR temperature, the compressor inlet temperature would be 120° C. which under boosted conditions might exceed the compressor outlet temperature limits. However, if the mixed flow post the charge air cooler is recirculated, the compressor inlet temperature could be controlled to a much lower value since the flow would be diluted. For example, if the same flow conditions as above are used but with 50% recirculation of post-cooler compressed flow at 30° C., the combination would yield a compressor inlet temperature of 75° C. As another example, keeping recirculation at 50% and reducing EGR to 10% would result in a temperature of 45° C. at the compressor inlet.

In this manner, managing the EGR valve and CRV together could ensure rapid warm up of the system with no risk of condensation at the inlet since the EGR is much hotter. Also, a risk of over-temperature of the compressor outlet is also reduced. Overall, the approach would limit EGR under hot conditions to ensure component maximum limits are not exceeded, and boosted engine performance is improved.

Now turning to FIG. 5, an example routine 500 is shown for adjusting the composition of a mixture of cooled compressor recirculation flow and un-cooled exhaust gas recirculation and delivering the mixture to a compressor inlet. The approach enables improved compressor temperature management.

At 502, the routine includes estimating and/or measuring engine operating conditions which may include engine speed, torque demand, MAP, MAF, manifold temperature, ambient conditions (ambient temperature, BP, ambient humidity), compressor conditions (compressor inlet temperature and pressure, compressor outlet temperature and pressure, compressor flow rate), engine temperature, etc.

At 504, the routine includes determining an amount of compressor recirculation required based on the estimated operating conditions. Further, a position or degree of opening of the compressor recirculation valve (CRV 62 of FIG. 1) may be determined based on the required amount of recirculation. In one example, during steady-state boosted engine operating conditions, a nominal amount of compressor recirculation may be required, for example, to maintain a nominal flow rate through the compressor. The nominal flow through the compressor may allow some compressed flow to be continuously recirculated from downstream of the compressor and downstream of the charge air cooler to the compressor inlet via the recirculation passage, thereby improving a margin to surge during the steady-state boosted engine operation. As such, this reduces the frequency of surge occurrence. In one example, where the CRV is a continuously variable valve, this may be achieved by holding the valve in a partially-open position during the steady-state conditions. In another example, where the CRV is a three-state valve, this may be achieved by holding the valve in a semi-open position during the steady-state conditions. Alternatively, during the steady-state boosted conditions, no compressor recirculation may be required and the CRV may be actuated closed.

At 506, the routine includes determining an amount of exhaust gas recirculation required based on the estimated operating conditions. Further, a position or degree of opening of the EGR valve (EGR valve 52 of FIG. 1) may be determined based on the required amount of recirculation. In one example, the amount of EGR required may be based on an amount of engine dilution required during the current engine operating conditions. As the amount of dilution required increases, a larger EGR valve opening may be determined to provide the desired dilution. In another example, a higher amount of EGR may be required to reduce emissions (e.g., NOx emissions). As such, to provide the exhaust gas recirculation, exhaust gas released from the engine cylinders via cylinder exhaust valves is drawn from the exhaust manifold, downstream of an exhaust manifold turbine, and delivered to the compressor. In particular, the exhaust gas flows unobstructed between the exhaust manifold and the EGR valve, without passing through an EGR cooler. In other words, un-cooled exhaust gas drawn from the exhaust manifold is passed directly on to the compressor inlet, without being actively cooled by passage through an intercooler, or EGR cooler, or other second fluid cooling device (such as a water-air heat exchanger or coolant-based heat exchanger). As elaborated below, the controller may mix the EGR with the compressor recirculation flow upstream of the compressor inlet, wherein a composition of the mixture is adjusted based on compressor conditions to provide the desired dilution while also maintaining the compressor inlet temperature and/or outlet temperature within limits.

It will be appreciated that while the routine of FIG. 5 suggests exhaust gas flowing between the exhaust manifold and the EGR valve without passing through an EGR cooler, it will be appreciated that in alternate embodiments, an EGR cooler may be included in the EGR passage and the exhaust gas may flow between the exhaust manifold and the EGR valve upon passing through the EGR cooler. However, by using cool compressor recirculation flow to further cool the exhaust gas before delivery to the compressor inlet, a substantially downsized EGR cooler may be used. The smaller EGR cooler may provide component size reduction and cost reduction benefits.

At 507, the routine includes determining a boost required to meets demanded engine torque based on the estimated operating conditions. Further, a position or degree of opening of the wastegate (WG 92 of FIG. 1) may be determined based on the required amount of boost. In one example, during medium speed and load conditions the wastegate may be mostly closed to deliver sufficient boost. In another example, during low speed and low load, the wastegate may be commanded fully open.

The routine proceeds to 508 to determine if there is an indication of surge. In one example, surge may occur in response to an operator pedal tip-out. Therein, during boosted conditions, due to the sudden drop in air flow and torque demand, the air intake throttle may be closed causing a compressor flow to decrease, leading to surge. In one example, the controller may infer surge based on the pedal displacement during the pedal tip-out (e.g., displacement being higher than a threshold). In another example, the controller may monitor compressor pressure conditions and may infer surge based on a compressor flow shifting to the left of a surge line on a compressor map.

If an indication of surge is confirmed, then at 514, the routine includes adjusting a composition of the mixture based on the indication of compressor surge. In particular, the adjusting may include increasing an amount of cooled compressor recirculation flow in the mixture as the indication of surge exceeds a threshold. Increasing an amount of compressor recirculation flow may include increasing an opening of the first compressor recirculation valve located in the first compressor recirculation passage. For example, if the CRV is a three-state valve, the valve may be shifted from the semi-open position to a fully-open position. In another example, where the CRV is a continuously variable valve, the increasing may include increasing an opening of the valve from the partially-open position to or towards a fully-open position.

Herein, by increasing the amount of cooled compressor recirculation flow in response to the indication of surge, multiple benefits are achieved. First, boost pressure downstream of the compressor is rapidly reduced compressor flow rate is increased. As another example, by recirculating cooled compressed air from downstream of the charge air cooler (rather than un-cooled compressed air from upstream of the charge air cooler), a temperature amplification effect of the recirculation is reduced. In particular, increased reheating of the compressed air during re-boosting through the compressor is reduced and compressor temperatures (at the compressor inlet and outlet) are maintained below limits. This reduces risk of thermal damage to system components. The controller may also, optionally, concurrently decrease an amount of exhaust gas recirculation by decreasing an opening of the EGR valve located in the second EGR passage.

However, if compressor inlet gas with EGR is cooled too much, condensation may occur. Therefore, the routine moves to 516 where it is determined if the compressor inlet temperature has fallen below a condensation limit or condensation threshold temperature. If so, the routine proceeds to 518, where EGR and CRV flow are simultaneously adjusted to reduce propensity for surge and condensation. Specifically, when the EGR level required to raise the compressor inlet temperature above the condensation limit does not exceed combustion limits, EGR is raised and CRV flow is correspondingly lowered to maintain a constant corrected compressor flow. When the level is such that it would exceed combustion limits, the EGR is disabled and CRV is increased to maintain a constant corrected compressor flow. In either scenario, condensation at the compressor inlet and compressor surge are avoided. If the compressor inlet temperature is not below the condensation limit, the routine ends.

Returning to 508, if there is no indication of compressor surge, the routine proceeds to 510, where it may be determined if the compressor exit temperature is expected to rise above a threshold. For example, based on the EGR requested at 506, and compressor recirculation requested at 504, and further based on compressor conditions, the compressor exit temperature can be estimated and compared to a threshold calibrated to prevent coking or damage to the compressor or other air induction system components.

If the temperature threshold is expected to be exceeded, then at 520, the routine includes mixing compressor recirculation flow from downstream of a charge air cooler with exhaust gas, delivering the mixture to a compressor inlet, and adjusting a composition of the mixture based on the compressor inlet temperature so as to reduce compressor exit temperature. In particular, the adjusting includes increasing an amount of compressor recirculation flow and/or reducing the EGR flow as the compressor inlet temperature rises above a threshold.

In one example, the controller may use the relationships depicted in FIGS. 2-4 to infer a compressor inlet and/or outlet temperature based on compressor conditions such as boost level, compressor efficiency, and compressor pressure ratio. Since compressors are limited by a maximum outlet temperature which is a function of their inlet temperature and the compressor ratio, to maintain the compressor outlet pressure and temperature at or around a target outlet pressure and temperature, the controller may estimate a maximum permissible compressor inlet temperature (corresponding to the maximum permissible compressor outlet temperature) for the given set of engine operating conditions. The controller may then adjust the proportion of EGR flow and compressor recirculation flow received at the compressor inlet to limit the compressor inlet temperature and/or the compressor outlet temperature within the maximum permissible temperature limits.

Increasing an amount of compressor recirculation flow may include increasing an opening of a first compressor recirculation valve located in a first passage coupling an outlet of the charge air cooler to the compressor inlet (the compressor recirculation passage). For example, if the CRV is a three-state valve, the valve may be shifted from the semi-open position to the fully open position. In another example, where the CRV is a continuously variable valve, the increasing may include increasing an opening of the valve from the partially-open position to or towards a fully-open position.

Decreasing an amount of exhaust gas may include decreasing an opening of a second EGR valve located in a second passage coupling an outlet of the turbine to the compressor inlet (the EGR passage). As shown at FIG. 1, the first passage may be coupled to the second passage at a junction located downstream of each of the first and second valves and upstream of the compressor inlet.

For example, if the ambient temperature is 0° C. and the EGR temperature is 600° C., the compressor inlet temperature would be 120° C. which under boosted conditions might cause the compressor outlet temperature to exceed the compressor outlet temperature limits. However, if post-charge air cooler recirculation is enabled, the compressor inlet temperature could be controlled to a much lower value since the flow entering the compressor would be diluted. For example, if the same flow conditions were used but with 50% recirculation of post-cooler compressor flow at 30° C. enabled, the combination would yield a compressor inlet temperature of 75° C. As another example, keeping recirculation at 50% and reducing EGR to 10% would result in a temperature of 45° C. at the compressor inlet.

The routine then proceeds to 522 where it may be determined if the wastegate has sufficient authority to deliver the desired boost in the presence of the additional recirculation flow. For example, if wastegate is fully closed and still cannot meet desired boost, the routine moves to 524, where EGR may be reduced to simultaneously reduce necessary compressor work and compressor inlet and exit temperatures. It may also be necessary to also reduce compressor recirculation flow to sufficiently lower the compressor power requirement. The wastegate is then set to the value needed to deliver desired boost, as well as adjusted EGR and CRV flow. The routine then ends.

If at 522 it is determined that wastegate has sufficient authority to meet the boost demand, the routine moves to 526 where the wastegate is adjusted appropriately and the routine ends.

Returning to 510, if it is determined that the compressor exit temperature is not expected to rise above a threshold, the routine proceeds to 512 where the EGR and CRV valves and the wastegate are maintained at the scheduled positions determined in 504-507.

As an example, during a first condition, a controller may mix compressor recirculation flow from downstream of a charge air cooler with unobstructed exhaust gas recirculation from downstream of a turbine in a first proportion responsive to compressor exit temperature. The unobstructed exhaust gas recirculation may include low pressure exhaust gas recirculation in the mixture that is delivered to the compressor inlet via an EGR valve without passing through an intercooler. The first proportion may include a lower amount of exhaust gas recirculation and a higher amount of compressor recirculation flow. During a second condition, the controller may mix the compressor recirculation flow with the exhaust gas recirculation in a second, different proportion responsive to surge. The second proportion may include a lower amount of exhaust gas recirculation and an even higher amount of compressor recirculation flow. As such, during each of the first and second conditions, the flows may be mixed at a location upstream of the compressor inlet and the mixture may be delivered to the compressor inlet. the mixing in a first proportion responsive to surge includes mixing in the first proportion responsive to a compressor ratio being outside a hard surge limit, and wherein the mixing in a second proportion responsive to condensation includes mixing in the second proportion responsive to a compressor exit temperature being below a threshold, the threshold based on each of compressor inlet temperature, pressure ratio and efficiency.

It will be appreciated that while the depicted examples illustrate adjusting the mixture to vary a proportion of compressor recirculation flow and LP-EGR flow to the compressor, during some conditions, the proportion may be adjusted to include all compressor recirculation flow and no EGR, or all EGR and no compressor recirculation flow. For example, in response to surge, the proportion may be adjusted to include all compressor recirculation flow and no EGR. As another example, the proportion may be adjusted to include no compressor recirculation flow and all EGR when compressor temperature constraints are not present.

It will also be appreciated that as referred to herein, the EGR is an un-cooled low pressure EGR drawn from downstream of the turbine. In further embodiments, an amount of cooled high pressure EGR drawn from upstream of the turbine and delivered to the intake downstream of the compressor may be adjusted based on the amount of LP-EGR delivered to the engine.

It will be further appreciated that in alternate embodiments, an EGR cooler may be included in the EGR passage and exhaust gas may flow between the exhaust manifold and the EGR valve upon passing through the EGR cooler. However, by using cool compressor recirculation flow to cool the exhaust gas, substantial downsizing of the EGR cooler may be possible.

Figure 6:
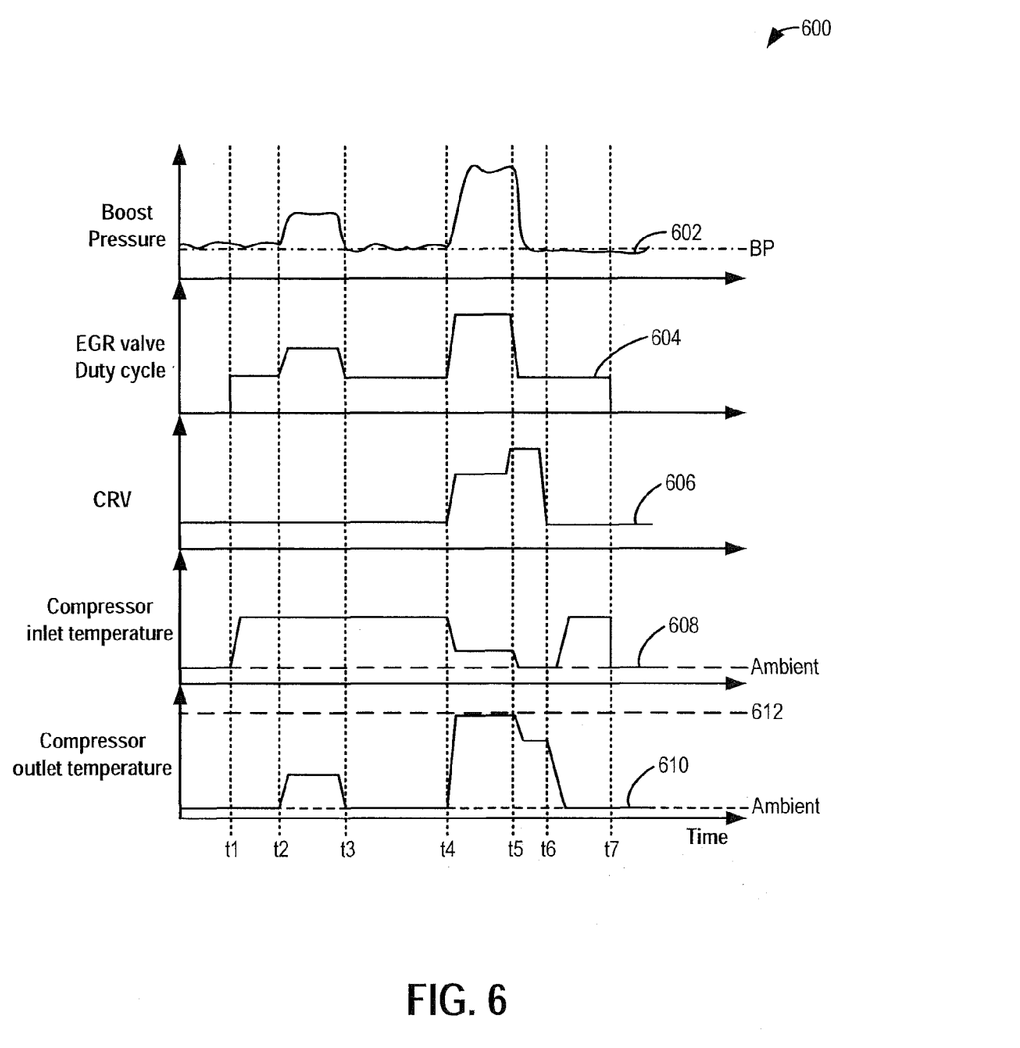
FIG. 6 shows an example coordinated adjustment of an EGR valve and a CRV to reduce compressor inlet condensation, according to the present disclosure.

Now turning to FIG. 6, map 600 depicts example adjustment to a CRV and an EGR valve to enable thermal management of a compressor. Map 600 depicts boost pressure at plot 602, an EGR valve duty cycle at plot 604, CRV valve adjustments at plot 606, a compressor inlet temperature at plot 608, and a compressor outlet temperature at plot 610.

Prior to t1, the engine may be operating without boost (e.g., at barometric pressure, BP) and with no EGR. In addition, the CRV may be held closed. At t1, due to a change in operating conditions, EGR may be requested and accordingly, the EGR valve duty cycle may be adjusted to provide nominal low pressure EGR. As the EGR valve is opened to deliver hot exhaust residuals to the compressor inlet, a compressor inlet temperature may start to rise above ambient temperature (dashed line). As such, when no compressor recirculation is provided, the compressor inlet temperature varies as a function of the ambient temperature and the amount of EGR delivered.

At t2, a small boost demand may be received. In response to the boost demand, boost pressure (plot 602) may be increased to meet the boost demand. During the boost demand, the EGR valve duty cycle may also be increased (plot 604) based on the boost demand to meet the transient increase in boost demand. As the intake aircharge is compressed through the compressor, compression heating occurs leading to a rise in compressor outlet temperature (plot 610). However, due to the lower amount of compression heating, due to the smaller boost demand, the compressor inlet temperature (plot 608) remains within permissible limits and does not have to be regulated. As a result, during the boost condition at t2, the CRV is maintained closed (plot 606) because the compressor inlet temperature does not need to be limited.

At t3, the boost condition may end, and the boost pressure may be returned to BP. As compression heating at the compressor stops, the compressor outlet temperature may also return to ambient temperature levels (dashed line). However, EGR may continue to be delivered during the non-boosted conditions following t3. Due to the EGR valve being open and the CRV being closed, the compressor outlet temperature may remain above the ambient temperature.

At t4, a large boost demand may be received. In response to the boost demand, boost pressure may be increased to meet the higher boost demand. During the boost demand, the EGR valve duty cycle may be increased based on the boost demand to meet the transient increase in boost demand. As the intake aircharge is compressed through the compressor, compression heating occurs leading to a larger rise in compressor outlet temperature. Herein, due to the higher amount of compression heating, due to the larger boost demand, the compressor inlet temperature operates close to an upper threshold 612. As a result, during the boost condition at t4, the CRV is maintained partially open. Due to the opening of the CRV along with the opening of the EGR valve, at t4, the compressor inlet temperature falls towards the ambient temperature.

At t5, the boost demand may be suddenly reduced causing the compressor to reach a surge condition. In response to the indication of surge the CRV is shifted to a fully open position, enabling recirculation of cooled compressed air from downstream of a charge air cooler to the compressor inlet. In addition, the EGR valve opening is reduced. The combined approach of reducing EGR and increasing compressor recirculation reduces the compressor inlet and outlet temperature. Specifically, each of the compressor inlet and outlet temperature is reduced to ambient temperature.

At t6, boost pressure has reduced. In addition, the CRV may be closed since the surge condition is absent. Due to the CRV being closed while the EGR valve is still nominally open, the compressor inlet temperature may rise above the ambient temperature at t6 (due to the receiving of hot residuals at the compressor inlet).

At t7, due to a change in operating conditions, EGR request may drop and the EGR valve may be closed. In response to closing of the EGR valve, the compressor inlet temperature may return towards ambient levels.

In this way, the compressor inlet temperature and outlet temperature may be controlled and limited using adjustments to an EGR valve and a compressor recirculation valve during changes in boost demand. In doing so, the compressor may be kept outside a surge region.

In one example, an engine system, comprises an engine including an intake throttle, a turbocharger including a compressor driven by a turbine, a temperature sensor coupled to the compressor and a charge air cooler coupled downstream of the compressor. The engine system may further include a first path including a first valve for recirculating compressed aircharge from downstream of the charge air cooler and upstream of the throttle to a compressor inlet. The engine system may also include a second path including a second valve for recirculating exhaust gas unobstructed from downstream of the turbine to the compressor inlet, the second path merging with the first path downstream of the second valve and upstream of the compressor inlet. A controller of the system may be configured with computer readable instructions for adjusting each of the first and second valve to provide a variable mixture of compressor recirculation flow and exhaust gas recirculation to the compressor inlet. A composition of the variable mixture may be adjusted based on one or more of a compressor inlet temperature and a compressor outlet temperature. For example, the composition may be adjusted to maintain the compressor inlet temperature above a first threshold and/or maintain the compressor outlet temperature below a second threshold. Adjusting each of the first and second valve to provide a variable mixture may also include increasing an opening of the first valve while decreasing an opening of the second valve to reduce a temperature of the mixture and decreasing an opening of the first valve while increasing an opening of the second valve to increase a temperature of the mixture. The controller may include further instructions for adjusting the composition of the variable mixture based on an indication of surge, the adjusting including increasing an opening of the first valve while decreasing an opening of the second valve. In one example, the adjusting includes, responsive to the indication of surge, fully opening the first valve while fully closing the second valve, and wherein the adjusting responsive to the compressor inlet temperature includes fully closing the first valve while fully opening the second valve.

In this way, a compressor temperature may be managed using a combination of cooled compressor recirculation flow and un-cooled EGR. By using cool compressor recirculation flow to lower a compressor inlet temperature, compressor thermal management is enabled using existing engine hardware while synergistically improving a surge margin of the compressor. By reducing the reliance on an EGR cooler for managing the compressor inlet temperature, component reduction benefits are achieved. By reducing the formation of condensation at the compressor inlet, issues related to the ingestion of condensate (such as misfire, degradation of compressor blades, and engine stall) can be better reduced. By maintaining the compressor inlet and outlet temperature within a range where compressor performance is higher, boosted engine performance is improved and compressor life is extended.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a boosted engine, comprising:
    determining, via an electronic control unit, engine operating conditions including determining a required amount of compressor recirculation;
    adjusting one or more of a first valve in a compressor recirculation passage, and a second valve in an exhaust gas recirculation passage, to form a mixture of compressor recirculation flow from downstream of a charge air cooler with exhaust gas flow from the exhaust gas recirculation passage; and
    delivering the mixture to a compressor inlet.

2. The method of claim 1, wherein the exhaust gas includes exhaust gas drawn from downstream of an exhaust manifold turbine, the exhaust gas flowing between the exhaust manifold and an exhaust gas recirculation (EGR) valve.

3. The method of claim 2, wherein the exhaust gas flowing between the exhaust manifold and the EGR valve includes the exhaust gas bypassing an EGR cooler and flowing unobstructed between the exhaust manifold and the EGR valve.

4. The method of claim 2, further comprising, estimating a compressor inlet temperature and adjusting a composition of the mixture based on the compressor inlet temperature.

5. The method of claim 4, wherein the adjusting includes, when EGR required to raise compressor inlet temperature does not exceed a combustion limit, decreasing an amount of compressor recirculation flow and increasing an amount of exhaust gas in the mixture as the compressor inlet temperature falls below a threshold, and when EGR required to raise compressor inlet temperature exceeds the combustion limit, disabling the addition of exhaust gas to the mixture while increasing the amount of compressor recirculation flow in the mixture as the compressor inlet temperature falls below the threshold.

6. The method of claim 5, wherein the threshold is based on one or more of ambient temperature, ambient humidity, and a water content of the mixture.

7. The method of claim 6, wherein decreasing an amount of compressor recirculation flow includes decreasing an opening of the first valve located in the compressor recirculation passage coupling an outlet of the charge air cooler to the compressor inlet, and wherein increasing an amount of exhaust gas includes increasing an opening of the second valve located in the exhaust gas recirculation passage coupling an outlet of the turbine to the compressor inlet.

8. The method of claim 7, wherein the compressor recirculation passage is coupled to the exhaust gas recirculation passage at a junction located downstream of each of the first and second valves and upstream of the compressor inlet.

9. The method of claim 1, further comprising adjusting a composition of the mixture based on a compressor outlet temperature and a combustion stability limit, the adjusting including one or more of increasing an amount of compressor recirculation flow and decreasing an amount of exhaust gas in the mixture as the compressor outlet temperature exceeds a threshold while a combustion stability limit is not exceeded.

10. The method of claim 1, further comprising adjusting a composition of the mixture based on an indication of compressor surge, the adjusting including increasing an amount of compressor recirculation flow and optionally decreasing an amount of exhaust gas in the mixture as the indication of surge exceeds a threshold.

11. A method for a boosted engine, comprising:
estimating, via an electronic control unit, engine operating conditions based on air intake flow at at least one of a compressor inlet or a charge air cooler outlet indicating condensation and based on a compressor air intake flow indicating a surge condition;
during a first condition, mixing compressor recirculation flow from downstream of a charge aft cooler with exhaust gas recirculation flow from an exhaust gas recirculation passage, flowing unobstructed from downstream of a turbine, in a first proportion responsive to a condensation threshold temperature; and
during a second condition, mixing the compressor recirculation flow with the exhaust gas recirculation in a second, different proportion responsive to surge,
adjusting one or more of a first valve in a compressor recirculation passage, and a second valve in a exhaust gas recirculation passage to control the mixing of flow into the engine during the first and second conditions.

12. The method of claim 11, wherein during each of the first and second conditions, the mixture is delivered to a compressor inlet.

13. The method of claim 12, wherein the first proportion includes a higher amount of exhaust gas recirculation and a lower amount of compressor recirculation flow and wherein the second proportion includes a lower amount of exhaust gas recirculation and a higher amount of compressor recirculation flow.

14. The method of claim 13, wherein the exhaust gas recirculation flowing unobstructed includes low pressure exhaust gas recirculation in the mixture, flowing unobstructed from downstream of the turbine to the compressor inlet via an exhaust gas recirculation (EGR) valve without passing through an intercooler.

15. The method of claim 11, wherein the second condition includes a compressor ratio being outside a hard surge limit, and wherein the first condition includes a compressor inlet temperature being below a threshold, the threshold based on each of ambient humidity, ambient temperature, and a water content of the exhaust gas recirculation.

16. An engine system, comprising:
an engine including an intake throttle;
a turbocharger including a compressor driven by a turbine;
a temperature sensor coupled to the compressor;
a charge air cooler coupled downstream of the compressor;
a first path including a first valve for recirculating compressed aircharge from downstream of the charge air cooler and upstream of the throttle to a compressor inlet;
a second path including a second valve for recirculating exhaust gas from downstream of the turbine to the compressor inlet, the second path merging with the first path downstream of the second valve and upstream of the compressor inlet; and
a controller with computer readable instructions stored on a non-transitory medium for:
receiving one or more of a compressor inlet temperature and a compressor outlet temperature from the temperature sensor; and
sending a control signal to adjust each of the first and second valve to provide a variable mixture of compressor recirculation flow and exhaust gas recirculation to the compressor inlet, a composition of the variable mixture adjusted based on one or more of the compressor inlet temperature and the compressor outlet temperature.

17. The system of claim 16, wherein the composition adjusted based on one or more of the compressor inlet temperature and the compressor outlet temperature includes adjusting the composition to maintain the compressor inlet temperature above a first threshold and/or maintain the compressor outlet temperature below a second threshold.

18. The system of claim 17, wherein adjusting each of the first and second valve to provide a variable mixture includes increasing an opening of the first valve while decreasing an opening of the second valve to reduce a temperature of the mixture and decreasing the opening of the first valve while increasing the opening of the second valve to increase the temperature of the mixture.

19. The system of claim 18, wherein the controller includes further instructions for adjusting the composition of the variable mixture based on an indication of surge, the adjusting including increasing the opening of the first valve while decreasing the opening of the second valve.

20. The system of claim 19, wherein the adjusting includes, responsive to the indication of surge, fully opening the first valve while fully closing the second valve, and wherein the adjusting responsive to the compressor inlet temperature includes fully closing the first valve while fully opening the second valve.

* * * * *